United States Patent
Gresset (10) Patent No.: US 8,223,874 B2
(45) Date of Patent: Jul. 17, 2012

(54) FULL DIVERSITY HIGH-RATE CODED TRANSMIT BEAMFORMING TECHNIQUES USING PARTIAL-ALGEBRAIC PRECODING, AND ASSOCIATED NEAR-OPTIMAL LOW-COMPLEXITY RECEIVERS

(75) Inventor: Nicolas Gresset, Rennes Cedex (FR)

(73) Assignee: Mitsubishi Electric Corporation, Tokyo (JP)

( * ) Notice: Subject to any disclaimer, the term of this patent is extended or adjusted under 35 U.S.C. 154(b) by 664 days.

(21) Appl. No.: 12/400,351

(22) Filed: Mar. 9, 2009

(65) Prior Publication Data
US 2009/0268839 A1 Oct. 29, 2009

(30) Foreign Application Priority Data
Mar. 21, 2008 (EP) .................................... 08005392

(51) Int. Cl.
*H04B 7/02* (2006.01)
(52) U.S. Cl. ..................... 375/267; 375/260; 375/299
(58) Field of Classification Search .................. 375/247, 375/260, 265, 267, 299; 455/10, 522, 504
See application file for complete search history.

(56) References Cited

U.S. PATENT DOCUMENTS

| | | | | |
|---|---|---|---|---|
| 7,409,001 B2* | 8/2008 | Ionescu et al. | ................. | 375/267 |
| 7,440,510 B2* | 10/2008 | Sandhu et al. | ................. | 375/267 |
| 7,620,117 B2* | 11/2009 | Chae et al. | ..................... | 375/299 |
| 7,764,744 B2* | 7/2010 | Choi et al. | .................... | 375/267 |
| 7,764,754 B2* | 7/2010 | Walton et al. | ................. | 375/347 |
| 8,031,793 B2* | 10/2011 | Ionescu et al. | ................. | 375/267 |
| 2009/0060012 A1 | 3/2009 | Gresset et al. | | |

FOREIGN PATENT DOCUMENTS
WO WO 2008/024462 A2 2/2008

OTHER PUBLICATIONS

Sampath, H.; Stoica, P.; Paulraj, A.; , "Generalized linear precoder and decoder design for MIMO channels using the weighted MMSE criterion," Communications, IEEE Transactions on , vol. 49, No. 12, pp. 2198-2206, Dec. 2001.*

Shengli Zhou, et al., "Recursive and Trellis-Based Feedback Reduction for MIMO-OFDM with Rate-Limited Feedback", IEEE Transactions on Wireless Communications, XP011144966, vol. 5, No. 12, Dec. 2006, pp. 3400-3405.

Roya Doostnejad, et al., "Joint Precoding and Beamforming Design for the Downlink in a Multiuser MIMO System", Wireless and Mobile Computing, Networking and Communications, XP010838752, vol. 1, Aug. 22, 2005, 7 Pages.

* cited by examiner

*Primary Examiner* — David Ometz
*Assistant Examiner* — Fitwi Hailegiorgis
(74) *Attorney, Agent, or Firm* — Oblon, Spivak, McClelland, Maier & Neustadt, L.L.P.

(57) ABSTRACT

A system for transmitting data from a transmitter comprising at least two transmitting antennas, an encoder following an error correcting code structure and a transmit beamforming technique to a receiver comprising at least two receiving antennas and a decoder defined according to the error correcting code structure over a transmit beamformed MIMO channel. The coding rate $R_c$ of the encoder (ENC), the parameters of the transmit beamformed MIMO channel and a target diversity order of the system are selected dependently one from each other.

23 Claims, 1 Drawing Sheet

FULL DIVERSITY HIGH-RATE CODED TRANSMIT BEAMFORMING TECHNIQUES USING PARTIAL-ALGEBRAIC PRECODING, AND ASSOCIATED NEAR-OPTIMAL LOW-COMPLEXITY RECEIVERS

BACKGROUND OF THE INVENTION

The present invention relates generally to a system for transmitting data from a transmitter comprising at least two transmitting antennas, an encoder following an error correcting code structure and a transmit beamforming technique to a receiver comprising at least two receiving antennas and a decoder defined according to the error correcting code structure over a transmit beamformed MIMO channel.

In the following, a channel resource means a frequency bandwidth, a time interval and possibly several spatial dimensions brought by transmitting and receiving antennas placed in different spatial positions.

Signals transmitted over wireless channels undergo severe degradations due to channel variations such as fading and shadowing, which allow to consider the channel as a random variable. In the following, are considered slow channel variations with respect to the time needed for transmission of the information words, but the channel realization is supposed to have changed between two transmissions of information words. One major way to combat the so-called quasi-static fading is to provide diversity in either time, frequency or space.

The channel diversity order is defined as the number of independent fading random variables observed in the channel resource used for transmission. The transmission/reception scheme is able to collect a given amount of diversity, called diversity order of the system, upper bounded by the channel diversity order, also called full diversity order.

When an information word is not correctly estimated by the receiver, an error event occurs. The main parameter allowing to compute the probability of error associated to a given error event is the Euclidean distance between the noiseless received signal associated to the transmitted information word and the reconstructed noiseless received signal associated to the decoded information word. The diversity order of the error event is defined as the number of independent random variables involved in the Euclidean distance associated to the error event. Finally, the system diversity order is equal to the minimal diversity order of all possible error events or equivalently all possible pairs of information words.

Telecommunication systems in which a plurality of antennas are used at a receiver end and/or at a transmitter end of a wireless link are called Multiple Input Multiple Output systems (further referred to as MIMO systems). MIMO systems have been shown to offer large transmission capacities compared to those offered by single antenna systems. In particular, MIMO capacity increases with the number of transmitting or receiving antennas, whichever the smallest, for a given Signal-to-Noise Ratio and under favourable uncorrelated channel conditions. MIMO techniques are thus likely to be used in future wireless systems intended to provide large spectral efficiencies or, alternatively, reduce the transmitting power required for obtaining a spectral efficiency equivalent to that which is obtained in current telecommunication systems. Such MIMO techniques will very likely be combined with multi-carrier modulation techniques like OFDM, which allow to consider MIMO channel models with no inter-symbol interference.

The transmitter of MIMO systems comprises a digital modulator converting the coded bits stream into spatial streams of modulation symbols, the inputs of said digital modulator are coded bits, and the output of said digital modulator is vectors of $N_s \leq \min(N_t, N_r)$ modulation symbols. The system is then said to transmit $N_s$ spatial streams on the transmit MIMO channel.

An eigenvector transmit beamforming scheme can be used for improving the performance of MIMO channels. The matrix of the transmit beamformed MIMO channel is the concatenation of a $N_s \times N_t$ beamforming matrix and the $N_r \times N_t$ matrix H of the channel. The $N_s \times N_t$ beamforming matrix is derived from the eigenvectors associated to the $N_s$ best eigenvalues of the $N_r \times N_t$ matrix of the channel. The transmit beamforming technique then needs a partial knowledge of the matrix H at the transmitter to apply a pre-filtering which allows a low-complexity optimal detection at the receiver. For example, the partial knowledge is a quantized version of the channel estimation processed at the receiver and fed back from the receiver to the transmitter.

The eigenvector transmit beamforming scheme may reach the full diversity order under the assumption of a single transmitted spatial stream. When multiple spatial streams are transmitted with the aim of increasing the data rate of the scheme, the diversity order of the scheme is drastically reduced.

SUMMARY OF THE INVENTION

This invention aims at achieving high data rate and guarantying a target diversity and high performance while keeping the receiver complexity low. Indeed, the diversity reduction may be overcome by including an algebraic linear precoder which linearly combines modulation symbols at the transmitter side. However, such an algebraic linear precoder generally involves a high complexity detection at the receiver side.

Additionally, the inventor observed that including an error correcting encoder at the transmitter allows to take benefit from a fraction of the diversity brought by the multiple transmitting antennas, while this fraction is a function of the coding rate of the error correcting code. The inventor also observed that applying an algebraic linear precoder helps in recovering a fraction of the diversity order brought by the multiple transmitting antennas, this fraction is a function of the preceding size, defined as the number of modulation symbols combined together. By combining an error correcting code and the linear precoder at the transmitter, the preceding size and the coding rate of the error correcting can be selected dependently to observe a target diversity order at the receiver, e.g. the full diversity order.

It is an object of the invention to determine the relationship between the preceding size, the parameters of the transmit beamformed MIMO channel, and an achievable diversity order. Then, the precoding size can be selected to achieve a target diversity order of the system.

As the complexity of the detector increases with the preceding size, such a relationship between the preceding size, the parameters of the transmit beamformed MIMO channel, the error correcting code rate and a target diversity order helps in finding the minimal preceding size that allows to achieve the target diversity order and a reduced complexity of the receiver.

Furthermore, it is an other object of the invention to use an algebraic reduction technique to reduce the complexity of the detector while keeping the same diversity properties. Under this assumption, the performance of the detector is optimized if the precoding size is minimized.

The present invention concerns a system for transmitting data from a transmitter comprising at least two transmitting antennas, an encoder following an error correcting code structure and a transmitting beamforming technique, to a receiver comprising at least two receiving antennas and a decoder defined according to the error correcting code structure, over a MIMO channel. The system is characterised in that the coding rate of the encoder, the parameters of the transmit beamformed MIMO channel and a target diversity order of the system are selected dependently one from each other.

The receiver comprises a detector which outputs are estimates on the coded bits.

An equivalent channel model is then defined by gathering the digital modulator, the transmit beamformed MIMO channel and the detector. The inputs of said equivalent channel model are then the coded bits and the outputs of said equivalent channel model are either soft or hard estimates of the coded bits. Said equivalent channel model is then decomposed at the receiver as comprising a nested block fading channel.

A mathematical model of the nested block fading channel consists in a concatenation of blocks of equivalent channel coefficients. One coded bit is assumed to be transmitted on one block. All the coded bits transmitted on the same block experience the same equivalent channel coefficient. Each equivalent channel coefficient is a combination of one or several realizations of random variables bringing a given diversity order. The equivalent channel has five parameters which are the number $N_s$ of spatial streams, the number $N_t$ of transmitting antenna, the number $N_r$ of receiving antenna, a set of diversity orders $D=\{N_tN_r, (N_t-1)(N_r-1), \ldots, (N_t-N_s+1)(N_r-N_s+1)\}$ associated to the equivalent channel coefficient of each block, and a set of lengths of blocks $LB=\{LB(1), \ldots, LB(N_s)\}$, the number of concatenated blocks being equal to $N_s$ and $$\sum_{i=1}^{N_s} LB(i) = L$$

where L is the number of coded bits per codeword. Each block is associated to one spatial stream i to transmit. The length of each block LB(i) is derived from the number of bits per modulation symbol associated to the i-th spatial stream. The fading random variable associated to the i-th block is defined by a combination of a subset $\Sigma(i)$ of $D(i)$ independent random variables with the integer value $D(i) \leq N_tN_r$, such that $\Sigma(i+1) \subset \Sigma(i)$, which means $\forall i<j$, $D(i) \geq D(j)$ and assuming that $D(1)=N_tN_r$ has the highest diversity order. The coding rate $R_c$ of the encoder, the five parameters of said nested block fading channel and the achievable target diversity order δ of the system are then linked by the following relationship δ=D(i) where i is given by $$\sum_{k=1}^{i-1} LB(k) < R_c \sum_{k=1}^{|D|} LB(k) \leq \sum_{k=1}^{i} LB(k)$$

where |D| is the cardinality of the set D.

According to a characteristic of the transmitter, the transmitter further comprises an algebraic linear precoder the input of which is a vector of $N_s$ modulation symbols and the output of which are given to the input of the transmit beamformed MIMO channel. Said algebraic linear precoder has a parameter s which is called the preceding size which verifies $s \leq N_s$, and is intended to linearly combine together s modulation symbols of a same vector of $N_s$ modulation symbols to produce s combined modulation symbols. It provides an output vector of $N_s$ precoded symbols including s combined modulation symbols and $N_s$-s non-combined modulation symbols, associated to one transmission over the transmitting beamformed channel.

The linear precoder is represented by the multiplication of the input vector of $N_s$ modulation symbols by a $N_s \times N_s$ matrix.

According to an embodiment of the algebraic linear precoder, the precoded symbols of the output vector is obtained by the product of a vector of modulation symbols by a complex linear matrix S given by $$S = P_1 \begin{bmatrix} S' & 0 \\ 0 & I \end{bmatrix} P_2$$

where $P_1$ and $P_2$ are $N_s \times N_s$ permutation matrices and S' is a s×s matrix which satisfies that if a vector of s modulation symbols is multiplied by the matrix S', sent through a diagonal noisy Rayleigh fading channel of size s×s, and decoded by a maximum likelihood decoder, then the diversity order of the performance equals to s.

Preferably, the permutation matrix $P_1$ is chosen equal to an identity matrix, the permutation matrix $P_2$ is chosen such that the combined symbols $[X(1),X(N_s-s+2), \ldots, X(N_s)]$ of the output vector are linear combinations of the modulation symbols $[Z(1), \ldots, Z(s)]$ of said vector of modulation symbols, the other precoded symbols of such an output vector are non-combined symbols and satisfy $[X(2), \ldots, X(N_s-s+1)]=[Z(s+1), \ldots, Z(N_s)]$.

The equivalent nested channel, under this choice of linear precoder scheme, has the five parameters which are the number of spatial streams $N_s$, the number $N_t$ of transmitting antenna, the number $N_r$ of receiving antenna, a set of diversity orders $D=\{N_tN_r, (N_t-1)(N_r-1), \ldots, (N_t-N_s+s)(N_r-N_s+s)\}$ associated to the equivalent channel coefficient of each block, and a set of lengths of blocks $$LB = \left\{ LB(1) + \sum_{i=N_s-s+2}^{N_s} LB(i), LB(2), \ldots, LB(N_s - s + 1) \right\},$$

the number of concatenated blocks being equal to $N_s-s+1$ and $$\sum_{i=1}^{N_s-s+1} LB(i) = L$$

where L is the number of coded bits per codeword.

The coding rate $R_c$ of the encoder, the five parameters of said nested block fading channel and the achievable target diversity order δ of the system are then linked by the following relationship δ(s)=D(i) where i is given by $$\sum_{k=1}^{i-1} LB(k) < R_c \sum_{k=1}^{|D|} LB(k) \leq \sum_{k=1}^{i} LB(k)$$

Note that when s=1 means that no modulation symbols are combined together, the equivalent nested channel of the system in which the algebraic linear precoder is included is then the same equivalent nested channel of a system in which the transmitter does not comprise an algebraic linear precoder.

According to a characteristic of the system, the same modulation is used for each spatial stream, i.e., $\forall (i,j)$, $LB(i)=LB(j)=L/N_s$. The diversity $\delta(s)$ observed at the output of the receiver is then given by $$\delta(s)=\min(N_tN_r,(s+N_r-\lceil R_cN_s\rceil)(s+N_r-\lceil R_cN_s\rceil))$$

The receiver comprising a detector which outputs are estimates on coded bits, the detector comprises a first detector block intended to estimate the coded bits associated to the s combined modulation symbols of a vector of modulation symbols carried by a received vector and a second detector block intended to estimate the coded bits associated to the $N_s$–s non-combined modulation symbols of said vector of modulation symbols.

Preferably, the first detector allows to recover the diversity order brought by the algebraic linear precoder S' and the second detector is a linear detector providing either soft or hard output estimates on coded bits.

According to a characteristic of the receiver intended to provide low complexity detection, a vector received at the receiver being given by $$YV^\dagger = ZS\Delta + N_2$$

where $\Delta$ is a rectangular diagonal $N_s \times N_r$ matrix, which diagonal values are dependent non-identically distributed random variables sorted in decreasing order of magnitude; and $N_2$ is an additive white Gaussian noise vector. Said received vector is then given by $$YV^\dagger = [Z'S'D+N'; Z''D'+N'']$$

with Z=[Z'; Z''] is the vector of modulation symbols, D is a s×s diagonal matrix, D' is a $(N_s-s) \times (N_r-s)$ diagonal rectangular matrix, and N' and N'' both are noise vectors. The first detector then converts Z'S'D+N' into estimates on the coded bits associated to Z' and the second detector converts Z''D'+N'' into estimates on the coded bits associated to Z''.

Reducing the complexity of the first detector block is achieved by using an algebraic linear reduction as described in the following.

The present invention concerns also an apparatus for transmitting data to a receiver comprising at least two receiving antennas over a transmit beamformed MIMO channel. Said apparatus comprises at least two transmitting antennas, an encoder following an error correcting code structure and a digital modulator the output of which are vectors of $N_s$ modulation symbols. The receiver comprising a decoder defined according to the error correcting code structure, the apparatus is characterised in that it further comprises an algebraic linear precoder, parameter s of which being called the precoding size which verifies $s \leq N_s$. Said algebraic precoder is intended to linearly combine together s modulation symbols of a same vector of modulation symbols, called combined modulation symbols and to provide an output vector of precoded symbols associated to one transmission over the transmit beamformed MIMO channel.

The present invention further concerns an apparatus for receiving a vector of data from a transmitter comprising at least two transmitting antennas, over a transmit beamformed channel. Said apparatus comprising at least two receiving antennas, a decoder defined according to the error correcting code structure and a detector the outputs of which are estimates on coded bits, some components of said received vector being linear combinations of some modulation symbols of a same vector of modulation symbols to be transmitted. The apparatus is characterised in that the detector comprises a first detector block intended to estimate the coded bits associated to the modulation symbols of the vector of modulation symbols carried by said received data vector which are involved in said linear combinations and a second detector block intended to estimate the coded bits associated to the modulation symbols of said vector of modulation symbols which are not involved in said linear combinations. The linear combinations of modulation symbols being obtained at the transmitter side by an algebraic linear precoder, the apparatus is characterised in that the first detector block allows to recover the diversity order brought by said algebraic linear precoder, and the second detector is a linear detector providing either soft or hard output estimates.

BRIEF DESCRIPTION OF THE DRAWINGS

The characteristics of the invention will emerge more clearly from a reading of the following description of an example embodiment, the said description being produced with reference to the accompanying drawings, among which.

DETAILED DESCRIPTION OF THE INVENTION

Figure 1:
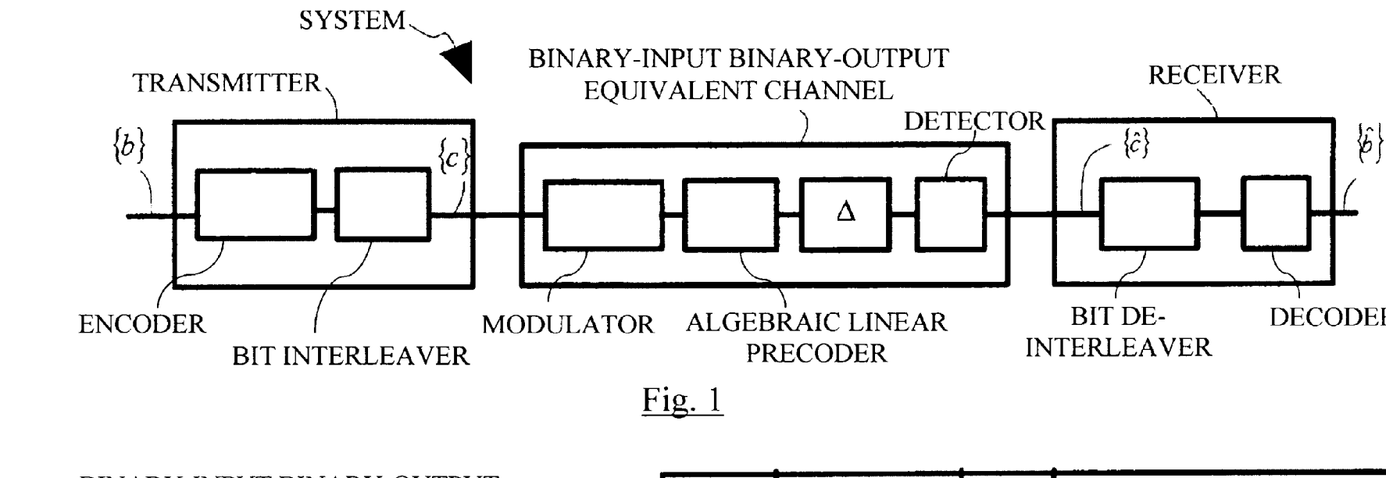
FIG. 1 represents a schema of a data transmission system over a beamformed MIMO channel.

The data transmission system SYST comprises a transmitter TRD comprising $N_t \geq 2$ transmitting antennas, a receiver RCV comprising $N_r \geq 2$ receiving antenna and a channel.

The transmitter TRD comprises an encoder ENC following an error correcting code structure, a digital modulator MOD, beamforming means TxBF implementing a transmit beamforming technique and according to a preferred embodiment an algebraic linear precoder ALP.

The receiver RCV comprises a detector DET and a decoder DEC defined according to the error correcting code structure.

The transmitter TRD is for example a base station, the receiver RCV is for example a mobile user equipment.

Roughly speaking, the digital transmission is made as follows: Information data bits {b} to be transmitted fed the encoder ENC with a Rate $R_c=K/L$, K is the number of input data bits {b} and L is the number of bits of the output codewords {c}. The encoder ENC may follow any type of error correcting code structure such as, for example, the LDPC (Low Density Parity Check) codes, turbo-codes, block-codes (Reed-Solomon for example), binary convolutional codes, etc.

A variant of the transmission system is to interleave the coded bits using a bit interleaver INT and to apply at the receiver side the associated bit de-interleaving using a bit de-interleaver DINT, as illustrated in FIG. 1. The bit interleaver INT is designed according to the error correcting code structure in order to ensure that the performance at the output of the associated decoder DEC exhibits the achievable target diversity order.

The digital modulator MOD is a BPSK (Binary Phase Shift Keying) or QPSK (Quadrature Phase Shift Keying) modulation for example and preferably a $2^m$-Quadrature Amplitude Modulation ($2^m$-QAM). The inputs of the digital modulator MOD are coded bits {c} or an interleaved version {c} of such coded bits according to the variant of the system, and the outputs are modulation symbols which form vectors Z of $N_s$ modulation symbols Z(i). The modulation applied for each of the $N_s$ symbols is not necessarily the same and may have different number of input bits.

The algebraic linear precoder ALP is mathematically represented by a $N_s \times N_s$ complex matrix S.

A vector Z of $N_s$ modulation symbols is multiplied by the $N_s \times N_t$ matrix S satisfying the following property:

$$S = P_1 \begin{bmatrix} S' & 0 \\ 0 & I \end{bmatrix} P_2$$

where $P_1$ and $P_2$ are permutation matrices and S' is a s×s matrix satisfying the following property: if a vector of s modulation symbols is precoded by the matrix S', sent through a diagonal noisy Rayleigh fading channel of size s×s, and decoded by a maximum likelihood decoder, then the diversity order of the performance equals to s which is the size of the square matrix S', called the preceding size. In other terms, S' is said to be a full diversity linear precoder.

The output of the precoder ALP is an output vector X of $N_s$ precoded symbols, s of them are linear combinations of modulation symbols Z(i) of a vector Z, called combined modulation symbols, and the other $N_s-s$ are equal to modulation symbols Z(i) of the same vector Z which are called non-combined modulation symbols.

The vector of symbols X is then given as the input of the transmit beamforming scheme, that outputs a vector X' of $N_t$ symbols. The input of the detector DET is a vector Y of $N_r$ symbols given by $$Y = X'H + N$$

where N is an additive white Gaussian noise vector of length $N_r$, and H is the $N_t \times N_r$ matrix of the channel which entries are independent complex Gaussian random variables.

Applying a singular value decomposition to H and selecting its $N_s$ best eigenvalues, the channel matrix H of the channel is written as $$H = U \Delta_H V \qquad (1)$$

U is a $N_t \times N_t$ unitary matrix ($U^\dagger U = I$)
V is a $N_r \times N_r$ unitary matrix ($V^\dagger V = I$)
and $\Delta_H$ is a diagonal rectangular $N_t \times N_r$ matrix which diagonal values are the min($N_t, N_r$) singular values sorted in decreasing order of magnitude. The singular values are dependent non-identically distributed random variables.

It is assumed that H, given by equation (1), is known at the transmitter as explained in the opening paragraph. The vector X' of $N_t$ precoded symbols is written by X'=XT, where the beamforming matrix T is the $N_s \times N_t$ matrix built from the $N_s$ first rows of $U^\dagger$, and $U^\dagger$ is the transpose conjugate of the matrix U. In other words, T is the matrix of projection on the sub-space associated to the $N_s$ best singular values of H. The received vector is then rewritten as $$Y = X \Delta V + N \Leftrightarrow YV^\dagger = (ZSTH+N)V^\dagger = X\Delta + N_2$$

where $\Delta'$ is a $N_s \times N_r$ diagonal matrix of the $N_s$ best singular values of H, and $N_2$ is an additive white Gaussian noise vector.

The i-th singular values have an associated diversity order $(N_t-i+1)(N_r-i+1)$. Furthermore, any pair of two singular values have a non-zero correlation.

Figure 2:
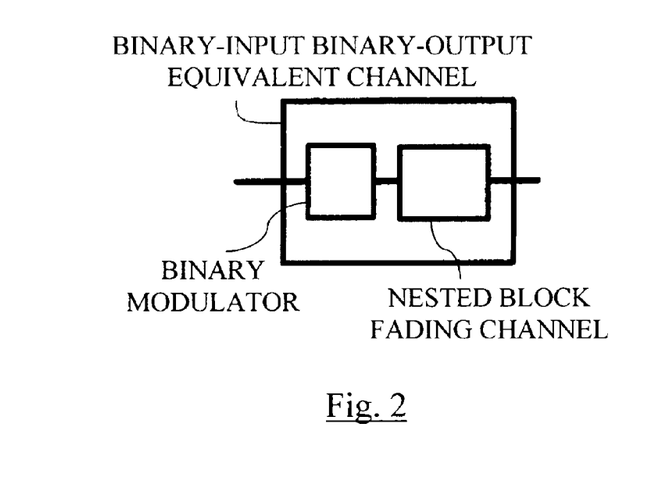
FIG. 2 represents a schema of a binary-input binary-output equivalent channel.

As illustrated in FIG. 2, gathering the digital modulator MOD, the algebraic linear precoder ALP, the beamformed means TxBF, the channel over transmitting and receiving antennas and the detector DET defines an equivalent channel model called a binary-input binary-output equivalent channel BIBOCH the inputs of which are coded bits and the outputs of which are either hard or soft estimations on the coded bits.

Thanks to the error correcting code ENC structure and optionally to the interleaver, the coded bits can then be seen at the receiver as if they were transmitted over the binary-input binary-output equivalent channel BIBOCH which can be considered as comprising a binary modulator BM and a nested block fading channel NBFCH as illustrated in FIG. 1. The binary modulator BM applies a scaled BPSK modulation, i.e, the '0' bit value and '1' bits value are respectively associated to two opposite values (e.g, A and −A). Moreover, the corresponding Euclidean distance 2A can change from the transmission of one bit to the other, it mainly depends on the digital modulation MOD binary mapping.

Figure 3:
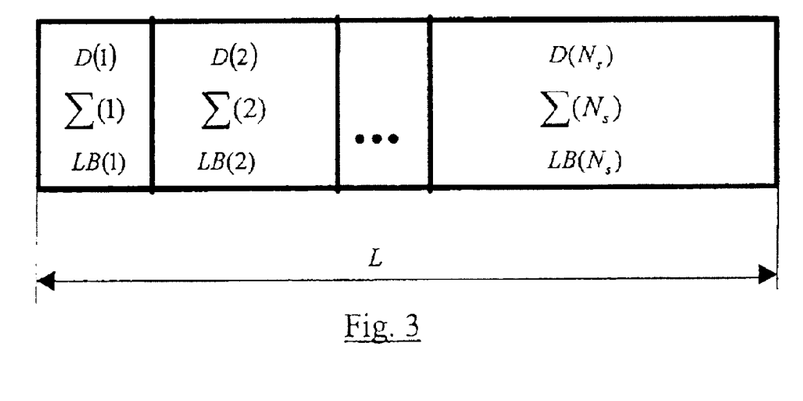
FIG. 3 represents a schema of the concatenation of blocks of a nested block fading channel.

Without linear preceding, i.e. s=1, a mathematical model of the nested block fading channel NBFCH consisting in a concatenation of blocks, as illustrated in FIG. 3, has then five parameters which are the number $N_s \leq \min(N_t, N_r)$ of spatial streams, the number of transmitting antenna $N_t$, the number of receiving antenna $N_r$, a set of diversity orders $D=\{N_tN_r, (N_t-1)(N_r-1), \ldots, (N_t-N_s+1)(N_r-N_s+1)\}$ associated to the equivalent channel coefficient of each block, and a set of lengths of blocks $LB=\{LB(1), \ldots, LB(N_s)\}$. The number of concatenated blocks equals to $N_s$ and $$\sum_{i=1}^{N_s} LB(i) = L$$

where L is the number of coded bits per codeword. The length of each block LB(i) is derived from the number of bits per modulation symbol associated to the i-th spatial stream. The fading random variable associated to the i-th block is defined by a combination of a subset $\Sigma(i)$ of D(i) independent random variables with the integer value $D(i) \leq N_t N_r$, such that $\Sigma(i+1) \subset \Sigma(i)$, which means $\forall i < j$, $D(i) \geq D(j)$ and assuming that $D(1) = N_t N_r$ has the highest diversity order.

Following such an equivalent channel model, the decoder DEC converts received versions $\{\hat{c}\}$ of coded bits $\{c\}$ into soft estimates $\{\hat{b}\}$ of information data bits $\{b\}$.

According to a characteristic of the transmitter TRD, the coding rate $R_c$ of the encoder ENC, the five parameters of the nested block fading channel NBFCH and the achievable target diversity order $\delta$ of the system are linked by the relationship $\delta = D(i)$ where i is given by $$\sum_{k=1}^{i-1} LB(k) < R_c \sum_{k=1}^{|D|} LB(k) \leq \sum_{k=1}^{i} LB(k)$$

where |D| is the cardinality of the set D.

The above equation then establishes a relationship between the coding rate $R_c$ of the encoder ENC, the five parameters of the channel (the number of spatial streams $N_s$, the number of transmitting antenna $N_t$, the number of receiving antenna $N_r$, the set of diversity orders D associated to the equivalent channel coefficient of each block, and the set of lengths of blocks LB) and a target diversity order relative to the number of singular values D(i) of the channel.

Note that, in practice, the modulation symbols Z(i) may be perturbed by other channel imperfections than the ones associated to the fading random variables, for example, additive noise, other multiplicative random variables. The important statement is that the set of random variables (singular values) producing the diversity order associated to Z(i) is the same set of random variables than the one associated to the transmission of Z(i−1) plus other random variables bringing additional orders of diversity.

According to an embodiment of the algebraic linear precoder ALP, the permutation matrix $P_1$ is chosen equal to an identity matrix, the permutation matrix $P_2$ is chosen such that the precoded symbols $[X(1), X(N_s-s+2), \ldots, X(N_s)]$ of the output vector are linear combinations of the combined modulation symbols $[Z(1), \ldots, Z(s)]$ of said vector of modulation symbols, the other precoded symbols of such an output vector are non-combined symbols and satisfy $[X(2), \ldots, X(N_s-s+1)]=[Z(s+1), \ldots, Z(N_s)]$. This embodiment improves the diversity order observed at the decoder output.

The inventor has observed that the transmit beamformed channel is orthogonal, which means that without any linear preceding, an optimal detection of the received signal is reached by performing a per-dimension processing at the detector DET which produces either hard or soft estimates on the coded bits.

Assuming now a linear preceding, i.e. s>1, an optimal detection is reached when the combined modulation symbols $[Z(1), \ldots, Z(s)]$ are jointly detected, for example by using an exhaustive marginalization if a soft-output is used as later explained. Such a characteristic of the detector allows to get a diversity of the performance observed at the output of the receiver is then given by $\delta(s)=D(i)$ where i is given by $$\sum_{k=1}^{i-1} LB(k) < R_c \sum_{k=1}^{|D|} LB(k) \le \sum_{k=1}^{i} LB(k)$$

where $D=\{N_tN_r, (N_t-1)(N_r-1), \ldots, (N_t-N_s+s)(N_r-N_s+s)\}$ and $$LB = \left\{LB(1) + \sum_{i=N_s-s+2}^{N_s} LB(i), LB(2), \ldots, LB(N_s-s+1)\right\}.$$

The above equation then establishes a relationship between the coding rate $R_c$ of the encoder ENC, the five parameters of the channel (the number of spatial streams $N_s$, the number of transmitting antenna $N_t$, the number of receiving antenna $N_r$, the set of diversity orders D associated to the equivalent channel coefficient of each block, and the set of lengths of blocks LB), the preceding size s and a target diversity order relative to the number of singular values D(i) of the channel.

The above equation establishes then that the coding rate $R_c$ of the encoder ENC, the number $N_s$ of spatial stream, the number $N_t$ of transmitting antenna, the number $N_r$ of receiving antenna and the preceding size s are dependent one from each other and may be selected to achieve a target diversity order of the system.

Increasing the preceding size s increases the diversity as perceived by the decoder ($s_1 \le s_2 \Leftrightarrow \delta(s_1) \le \delta(s_2)$). This demonstrates one of advantage of the system compared to the usual beamforming technique without linear precoding (s=1).

According to a characteristic of the system, the same modulation is used for each spatial stream, i.e., $\forall(i,j)$, $LB(i)=LB(j)=L/N_s$. The diversity $\delta(s)$ observed at the output of the receiver is then given by $\delta(s)=\min(N_tN_r,(s+N_t\lceil R_cN_s\rceil)(s+N_r-\lceil R_cN_s\rceil))$ Preferably, the preceding size s is chosen to achieve a target diversity order $\delta_t$ according to the following equation:

$$s = \arg\min_{s'}\{\delta(s') = \delta_t\}$$

The detector DET provides either hard or soft output estimates on the coded bits associated to a vector Z of modulation symbols Z(i) carried by a received vector Y as above-mentioned.

When the detector DET provides hard output of the coded bits, the optimal detection performance is achieved from a maximum likelihood (ML) detector when an exhaustive search over all the possible candidate vectors Z is proceeded for maximizing the likelihood probability p(Y|Z) i.e. finding the symbol $\tilde{Z}$ according to $$\tilde{Z} = \arg\min_{Z} p(Y|Z)$$

or for finding the symbol which minimizes a figure of merit which is for example the Euclidean distance $\|Y-ZSTH\|^2$ $$\tilde{Z} = \arg\min_{Z}(\|Y-ZSTH\|^2)$$

The estimates $\{\tilde{c}\}$ on coded bits associated to the s combined symbols are then obtained from the symbol $\tilde{Z}$.

When the detector DET provides soft output on the coded bits, the optimal detection performance is achieved from the MAP detector when an exhaustive search over all the possible candidate vectors Z is proceeded by maximising a figure of merit function that minimises the error probability for each coded bit $c_j$ associated to said vector Z of modulation symbols Z(i). For example, the estimate is an extrinsic probability or an A Posteriori Probability. The Maximum A Posteriori probability (MAP) detector allows to recover the diversity order $\delta(s)$. The A Posteriori Probability (APP) relative to a coded bit $c_j$ is computed via the following exhaustive marginalization:

$$APP(c_j) = \frac{\sum_{Z\in\Gamma(c_j=1)} P(Y|Z)\prod_j \pi(c_k = f(k, Z))}{\sum_{Z\in\Gamma} P(Y|Z)\prod_j \pi(c_k = f(k, Z))} \quad (2)$$

with $$p(Y|Z) = e^{-\frac{\|YV^\dagger - Z\times S\times\Delta\|^2}{2N_0}},$$

where $N_0$ is the noise variance, $\Gamma(c_j=1)$ is the set of possible candidate vectors Z, labelling of which have the i-th bit equal to 1, $\Gamma$ is the set of all possible candidate vectors Z, and f(k,Z) is the value of the k-th bit in the binary labelling associated to a potential candidate vector Z. The estimates on coded bits $\{\tilde{c}\}$ associated to a vector Z of modulation symbols Z(i) carried by a received vector Y is then obtained from the maximum A Posteriori Probability (APP) relative to each coded bit $c_j$. As a remark, the soft output estimate relative to a coded bit $c_j$ is also often expressed as a Log-Likelihood Ratio (LLR) given by $$LLR_j = \log\left(\frac{APP(c_j = 1)}{APP(c_j = 0)}\right)$$

The marginalization is made over the $2^{mN_s}$ possible candidate vectors Z and quickly becomes intractable as $mN_s$ grows.

According to a variant of the detector DET, the soft output estimate on coded bits associated to s combined symbols takes into account the a priori probabilities $\pi(c_j)$ associated to coded bits of said s combined modulation symbols and given by the output of the decoder DEC.

According to another characteristic of the receiver RCV, the detector DET is a low-complexity near-optimal detector of a received vector Y which produces estimates on the coded bits associated to a vector Z of $N_s$ modulation symbols $Z(i)$ carried by said received vector Y. The detector is said to be near-optimal if it can allow to achieve, after decoding, performance exhibiting the same diversity order as with an optimal detector.

According to an embodiment of such a near-optimal detector DET, the detector DET comprises a first detector block DET1 intended to estimate the coded bits associated to the s combined modulation symbols of a vector Z of modulation symbols $Z(i)$ carried by a vector Y and a second detector block DET2 intended to estimate the coded bits associated to the $N_s-s$ non-combined modulation symbols of said vector Z of modulation symbols. Note that any non-combined symbol is detected independently from any other combined or non-combined symbol.

Furthermore, the output estimate of the detector block DET1 is obtained independently of the output estimate of the detector block DET2, without any degradation of performance.

Furthermore, the detector block DET2 processes $N_s-s$ independent detections of the $N_s-s$ non-combined symbol. However, it is still necessary to have a joint detection of the s combined symbols to keep the optimality of the detector block DET1 and more generally the near-optimality of the detector DET.

According to a characteristic of the first detector block DET1, the first detector block DET1 allows to recover the diversity order brought by the algebraic linear precoder ALP, i.e. by the matrix S', for estimated coded bits associated to said s combined modulation symbols. Note that when the matrix S' is an identity matrix i.e. without linear preceding, the first detector block DET1 provides estimates on coded bits associated to the first modulation symbol $Z(1)$ of a vector Z of modulation symbols.

According to an embodiment of such a first detector block DET1, the estimate on coded bits associated to said s combined modulation symbols is preferably based on the computation of a function of an incomplete likelihood probability $p(Y_{s,0}|Z_{s,0})$ given by:

$$p(Y_{s,0}|Z_{s,0}) = e^{\frac{-\|Y_{s,0}V^\dagger - Z_{s,0} \times S \times \Delta\|^2}{2N_0}}$$

with $N_0$ being the noise variance, $Z_{s,0}$ being the vector Z of modulation symbols, with the non-combined symbols equal to 0, i.e., $Z_{x,0}=[Z(1), \ldots, Z(s), 0, \ldots, 0]$ and $Y_{s,0}=[Y(1), \ldots, Y(s), 0, \ldots, 0]$ is the received vector with last $(N_r-s)$ values equal to 0.

Then, by choosing the minimal $s \leq N_s$ value that allows to achieve a target diversity, the complexity of such a near-optimal detector DET is then minimized. Indeed, only $2^{ms}$ points for example belong to the list used to compute the soft output instead of $2^{mN_s}$.

According to an embodiment of the second detector block DET2, the detector block DET2 is a linear detector followed by a decision function Dec(.). Said linear detector provides either hard or soft output estimate using, preferably, for hard output estimates, a ZF (Zero Forcing) linear equalizer. A linear detector applies a linear transformation on the received symbol, i.e. a matrix multiplication. In the case of hard-output values, the decision function Dec( ) allows to convert the estimated received symbol into a sequence of bits.

As already stated, an advantage of the system is that increasing the preceding size $s \leq N_s$ increases the diversity as perceived by the decoder $(s_1 \leq s_2 \Leftrightarrow \delta(s_1) \leq \delta(s_2))$. Unfortunately, when the first detector block DET1 allows to recover the diversity order brought by the algebraic linear precoder ALP, the complexity of the detector DET increases with the value of the combining size s. On the opposite, a simple linear detector is proven not to be able to exploit the diversity order potentially brought by S. This drawback is overcome thanks to the use of an algebraic linear precoder which allows the implementation of an "algebraic lattice reduction" technique at the receiver. Such a receiver then allows a low complexity detector while guarantying the diversity order property.

According to an embodiment of such a low complexity detector, the detector DET includes an "algebraic lattice reduction" technique defined as follows:

Let $\Delta'=P_1\Delta$, and $$\Delta' = \begin{bmatrix} D & 0 \\ 0 & D' \end{bmatrix} \Leftrightarrow S\Delta = \begin{bmatrix} S'D & 0 \\ 0 & D' \end{bmatrix}$$

The received vector Y has then the following expression $$YV^\dagger = ZS\Delta + N_2 = Z\begin{bmatrix} S'D & 0 \\ 0 & D' \end{bmatrix} + N_2 = [Z'S'D+N'; Z''D'+N'']$$

with $Z=[Z';Z'']$ the vector of modulation symbols and D and D' both are diagonal rectangular matrices, and N' and N'' both are noise vectors.

According to this embodiment, the first detector block DET1 computes the conversion of $Z'S'D+N'$ into estimates on the coded bits associated to Z' and the second detector block DET2 computes the conversion of $Z''D'+N''$ into estimates on the coded bits associated to Z''.

Let us now assume that the s×s matrix D is decomposed in the following way $$D=\Omega\Psi\Phi$$

where $\Omega$ is a s×s diagonal matrix such that $S'\Omega=T_u S'$ and $T_u$ is a s×s basis change matrix (its entries are complex integer numbers). The diagonal s×s matrix $\Psi$ has positive real diagonal elements and the diagonal s×s matrix $\Phi$ has complex elements of unity modulus. For example, such a decomposition is possible if S' is a cyclotomic rotation as described in G. Rekaya, J-C. Belfiore and E. Viterbo, "A Very Efficient Reduction Tool on Fast Fading Channels", IEEE International Symposium on Information Theory and its Applications (ISITA), Parma, Italy, October 2004.

At the receiver, $\Omega$ is chosen to optimize the performance of the system and the matrix F is applied to the received signal $YV^\dagger$:

$$F = \begin{bmatrix} \Phi^\dagger \Psi^{-1} S'^\dagger & 0 \\ 0 & I \end{bmatrix} \Leftrightarrow YV^\dagger F = [Z'T_u + N'\Phi^\dagger \Psi^{-1} S'^\dagger; Z''D' + N''] \quad (2)$$

In the expression of the filtered received vector $YV^\dagger F$, the first detector block DET1 computes the conversion of the vector $Z'T_u + N'\Phi^\dagger \Psi^{-1} S'^\dagger$ into either hard or soft estimates on the coded bits associated to $Z'$ as above-explained and the second detector block DET2 computes the conversion $Z''D' + N''$ into either hard or soft estimates on the coded bits associated to $Z''$ as above-explained.

Consequently, an "algebraic lattice reduction" technique does not have any impact on the second detector block DET2 which can be chosen of any type, and for example as a linear soft or hard output detector to minimize the complexity of the second detector block DET2.

About the first detector block DET1, the inventor observes that $Z' \in \mathbb{Z}^{2s} \Leftrightarrow W = Z'T_u \in \mathbb{Z}^{2s}$ where $\mathbb{Z}^{2s}$ is the set of complex vectors of length s, entries of which have integer real and imaginary parts. The noise vector $N'\Phi^\dagger \Psi^{-1} S'^\dagger$ is not independent identical distributed complex gaussian, however, assuming that it is, the sub-optimality of the first detector block DET1 lies in this approximation, which however allows a strong complexity reduction while not impacting the diversity order at the output of the decoder.

Assuming that $Z' \in \Gamma$, where $Z'(i)$ is a QAM modulation symbol and $\Gamma$ is a s-dimensional complex QAM modulation space, and calling $\Gamma T_u$ the set of points satisfying $W \in \Omega_{Tu} \Leftrightarrow W = Z'T_u$, the above-described "algebraic lattice reduction" technique computes the soft output of the first detector DET1 by drawing a list of points $\Theta$ belonging to $\Omega_{Tu}$ around the received point $Z'T_u + N'\Phi^\dagger \Psi^{-1} S'^\dagger$ and by computing a marginalization on that list. Since the equivalent channel is orthogonal, a small list of point is sufficient to approach the performance of the optimal exhaustive marginalization. The reduction of complexity grows as the spectral efficiency of the system increases.

Thus, a target diversity order of the system is then always achieved, even when multiple spatial streams are transmitted over a precoded beamformed channel, which is not always the case of non-precoded beamformed channel.

The invention claimed is:

1. System for transmitting data from a transmitter comprising: at least two transmitting antennas, an encoder following an error correcting code structure and a transmit beamforming technique to a receiver comprising at least two receiving antennas and a decoder defined according to the error correcting code structure over a transmit beamformed MIMO channel, wherein the coding rate $R_c$ of the encoder, five parameters of said transmit beamformed MIMO channel and a target diversity order of the system are selected dependently one from each other, the transmitter comprising a digital modulator converting the coded bits stream into spatial streams of modulation symbols, the output of said digital modulator being vectors of $N_s$ modulation symbols ($Z(i)$), wherein the transmitter further comprises an algebraic linear precoder, a parameter s of which being called the precoding size, which verifies $s \leq N_s$, intended to linearly combine together s modulation symbols ($Z(i)$) of a same vector (Z) of modulation symbols, called combined modulation symbols and to provide an output vector (X) of precoded symbols ($X(i)$) associated to one transmission over the transmit beamformed MIMO channel, wherein the precoded symbols ($X(i)$) of said output vector (X) are obtained by the product of a vector (Z) of modulation symbols by a complex linear matrix S, said complex linear matrix S is given by $$S = P_1 \begin{bmatrix} S' & 0 \\ 0 & I \end{bmatrix} P_2$$

where $P_1$ and $P_2$ are permutation matrices and $S'$ is a s×s matrix which satisfies that if a vector of s modulation symbols is multiplied by the matrix $S'$, sent through a diagonal noisy Rayleigh fading channel of size s×s, and decoded by a maximum likelihood decoder, then the diversity order of the performance equals to s.

2. System according to claim 1, wherein the permutation matrix $P_1$ is chosen equal to an identity matrix, the permutation matrix $P_2$ is chosen such that the precoded symbols $[X(1), X(N_s-s+2), \ldots, X(N_s)]$ of the output vector are linear combinations of the combined modulation symbols $[Z(1), \ldots, Z(s)]$ of said vector of modulation symbols, the other precoded symbols of such an output vector are non-combined symbols and satisfy $[X(2), \ldots, X(N_s-s+1)] = [Z(s+1), \ldots, Z(N_s)]$.

3. System according to the claim 1, wherein the receiver comprises a detector the outputs of which are estimates on coded bits, an equivalent channel model being defined by gathering said digital modulator, said transmit beamformed MIMO channel and said detector, the inputs of said equivalent channel model being coded bits and the outputs of said equivalent channel model being either soft or hard estimates on the coded bits, said equivalent channel model being considered at the receiver as comprising a nested block fading channel a mathematical model of which consisting in a concatenation of blocks and having five parameters which are the number of spatial streams $N_s \leq \min(N_t, N_r)$, the number of transmitting antenna $N_t$, the number of receiving antenna $N_r$, a set of diversity orders $D = \{N_t N_r, (N_t-1)(N_r-1), \ldots, (N_t-N_s+s)(N_r-N+s)\}$ associated to the equivalent channel coefficient of each block, and a set of lengths of blocks $$LB = \left\{ LB(1) + \sum_{i=N_s-s+2}^{N_s} LB(i), LB(2), \ldots, LB(N_s - s + 1) \right\},$$

the number of concatenated blocks being equal to $N_s$ and $$\sum_{i=1}^{N_s} LB(i) = L$$

where L is the number of coded bits per codeword, the length of each block LB(i) being derived from the number of bits per modulation symbol associated to the i-th spatial stream, the fading random variable associated to the i-th block being defined by a combination of a subset $\Sigma(i)$ of D(i) independent random variables with the integer value $D(i) \leq N_t N_r$, such that $\Sigma(i+1) \subset \Sigma(i)$, which means $\forall i < j$, $D(i) \geq D(j)$ and assuming that $D(1) = N_t N_r$ has the highest diversity order, the coding rate ($R_c$) of the encoder, the five parameters ($N_s, N_t, N_r, D, LB$) of said nested block fading channel, the precoding size s and the achievable target diversity order $\delta$ of the system are linked by the relationship $\delta = D(i)$ where $i$ is given by $$\sum_{k=1}^{i-1} LB(k) < R_c \sum_{k=1}^{|D|} LB(k) \le \sum_{k=1}^{i} LB(k) \quad 5$$

where $|D|$ is the cardinality of the set D.

4. System according to claim 3, wherein the precoding size is equal to 1, the coding rate ($R_c$) of the encoder, the five parameters ($N_s$, $N_t$, $N_r$, D, LB) of said nested block fading channel and the achievable target diversity order $\delta$ of the system are linked by the relationship
$\delta = D(i)$ where $i$ is given by $$\sum_{k=1}^{i-1} LB(k) < R_c \sum_{k=1}^{|D|} LB(k) \le \sum_{k=1}^{i} LB(k)$$

where $|D|$ is the cardinality of the set D, $D=\{N_tN_r,(N_t-1)(N_r-1),\ldots,(N_t-N_s+1)(N_r-N_s+1)\}$ and $LB=\{LB(1),\ldots,LB(N_s)\}$.

5. System according to claim 3, wherein the same modulation is used for each spatial stream involving that all blocks of the equivalent nested block fading channel have the same length LB(i), and in that the diversity order of the system $\delta(s)$ observed at the output of the receiver is given by $\delta(s) = \min(N_t N_r,(s+N_t-\lceil R_c N_s \rceil)(s+N_r-\lceil R_c N_s \rceil))$.

6. System according to claim 3, wherein the precoding size s is chosen to achieve a target diversity order $\delta_t$ according to the following equation $$s = \arg\min_{s'}\{\delta(s') = \delta_t\}.$$

7. System according to claim 1, wherein the receiver comprises a detector the outputs of which are estimates on coded bits, the detector comprises a first detector block intended to estimate the coded bits associated to the s combined modulation symbols of a vector (Z) of modulation symbols (Z(i)) carried by a received vector (Y) and a second detector block intended to estimate the coded bits associated to the $N_s$–s non-combined modulation symbols of said vector (Z) of modulation symbols.

8. System according to claim 7, wherein the output estimate on the first detector block is obtained independently of the output estimate of the second detector block.

9. System according to claim 8, wherein the first detector block provides soft output estimates, said soft output estimates on coded bits associated to the s combined symbols take into account the a priori probabilities ($\pi(c_j)$) associated to coded bits of said s combined modulation symbols and given by the output of the decoder.

10. System according to claim 9, wherein the second detector block processes $N_s$–s independent detections of the $N_s$–s non-combined symbol.

11. System according to claim 7, wherein the first detector block allows to recover the diversity order brought by the algebraic linear precoder.

12. System according to claim 11, wherein the estimate on coded bits associated to said s combined modulation symbols is preferably based on the computation of a function of an incomplete likelihood probability $p(Y_{s,0}|Z_{s,0})$ given by:

$$p(Y_{s,0}|Z_{s,0}) = e^{\frac{-\|Y_{s,0}V^\dagger - Z_{s,0}\times S\times\Delta\|^2}{2N_0}}$$

with $N_0$ being the noise variance, $Z_{s,0}$ being the vector Z of modulation symbols, with the non-combined symbols equal to 0, i.e., $Z_{s,0}=[Z(1),\ldots,Z(s),0,\ldots,0]$ and $Y_{s,0}=[Y(1),\ldots,Y(s),0,\ldots,0]$ is the received vector with last (Nr–s) values equal to 0.

13. System according to claim 11, wherein a vector Y received at the receiver is given by $YV^\dagger = (ZSTH+N)V^\dagger = ZS\Delta+N_2$ where the matrix H of the channel is written as $H=U\Delta_H V$ with U a $N_t\times N_t$ and unitary and V is a $N_r\times N_r$ unitary matrix, $\Delta_H$ is a diagonal rectangular $N_t\times N_r$ matrix of diagonal values which are dependent non-identically distributed random variables sorted in decreasing order of magnitude, the beamforming matrix T being the $N_s\times N_t$ matrix built from the $N_s$ first rows of $U^\dagger$, and $U^\dagger$ is the transpose conjugate of the matrix U, the vectors N and $N_2$ being white Gaussian noise vectors, said received vector is given by $YV^\dagger = [Z'S'D+N';Z''D'+N'']$ with $Z=[Z'; Z'']$ being the vector of modulation symbols, D and D' both are s×s diagonal rectangular matrices, and N' and N'' both are noise vectors, and wherein the first detector block computes the conversion of Z'S'D+N' into estimates on the coded bits associated to Z' and the second detector block computes the conversion of Z''D'+N'' into estimates on the coded bits associated to Z''.

14. System according to claim 13, wherein the s×s matrix D being decomposed by $D=\Omega\Psi\Phi$ where $\Omega$ is a s×s diagonal matrix such that $S'\Omega=T_u S'$ and $T_u$ is a s×s basis change matrix which entries are complex integer numbers, the diagonal s×s matrix $\Psi$ has positive real diagonal elements and the diagonal s×s matrix $\Phi$ has complex elements of unity modulus, at the receiver $\Omega$ is chosen to optimize the performance of the system and the received signal $YV^\dagger$ is filtered by a matrix F given by $$F = \begin{bmatrix} \Phi^\dagger \Psi^{-1} S'^\dagger & 0 \\ 0 & I \end{bmatrix}$$

where I is an identity matrix, the first detector block computes the conversion of the vector $Z'T_u+N'\Phi^\dagger\Psi^{-1}S'^\dagger$ into either hard or soft estimates on the coded bits associated to Z' and the second detector block computes the conversion of Z''D'+N'' into either hard or soft estimates on the coded bits associated to Z''.

15. System as claimed in claim 7, wherein the second detector block is a linear detector providing either soft or hard output estimates.

16. System according to claim 15, wherein the second detector block provides soft output estimates, said soft output estimates on coded bits associated to $N_s$–s non-combined symbols take into account the a priori probabilities ($\pi(c_j)$) associated to coded bits of said $N_s$–s non-combined modulation symbols and given by the output of the decoder.

17. System according to claim 1, wherein the transmitter comprises a bit interleaver and the receiver comprises a de-interleaver, the bit interleaver being designed according to the error correcting code structure in order to ensure that the performance at the output of the associated decoder exhibits the achievable target diversity order.

18. Apparatus for transmitting data to a receiver comprising at least two receiving antennas over a transmit beamformed MIMO channel, said apparatus comprising: at least two transmitting antennas, an encoder following an error correcting code structure, a transmit beamforming technique and a digital modulator converting the coded bits stream into spatial streams of modulation symbols, the output of which are vectors of $N_s$ modulation symbols ($Z(i)$), said receiver comprising a decoder defined according to the error correcting code structure, wherein the apparatus for transmitting further comprises an algebraic linear precoder, a parameter s of which being called the precoding size, which verifies $s \leq N_s$, intended to linearly combine together s modulation symbols ($Z(i)$) of a same vector ($Z$) of modulation symbols, called combined modulation symbols and to provide an output vector ($X$) of precoded symbols ($X(i)$) associated to one transmission over the transmit beamformed MIMO channel, and the precoded symbols ($X(i)$) of said output vector ($X$) is obtained by the product of a vector ($Z$) of modulation symbols by a complex linear matrix S, said complex linear matrix S is given by $$S = P_1 \begin{bmatrix} S' & 0 \\ 0 & I \end{bmatrix} P_2$$

where $P_1$ and $P_2$ are permutation matrices and S' is a s×s matrix which satisfies that if a vector of s modulation symbols is multiplied by the matrix S', sent through a diagonal noisy Rayleigh fading channel of size s×s, and decoded by a maximum likelihood decoder, then the diversity order of the performance equals to s.

19. Apparatus according to claim 18, wherein the permutation matrix $P_1$ is equal to an identity matrix, the permutation matrix $P_2$ is chosen such that the precoded symbols [$X(1)$, $X(N_s-s+2)$, . . . , $X(N_s)$] of an output vector ($X$) are linear combinations of the combined modulation symbols [$Z(1)$, . . . , $Z(s)$] of said vector ($Z$) of modulation symbols, the other precoded symbols of such an output vector ($X$) satisfy [$X(2)$, . . . , $X(N_s-s+1)$]=[$Z(s+1)$, . . . , $Z(N_s)$].

20. Apparatus for receiving a vector of data ($Y$) from a transmitter comprising $N_t \geq 2$ transmitting antennas over a transmit beamformed MIMO channel, said apparatus comprising $N_r \geq 2$ receiving antennas, a decoder defined according to the error correcting code structure and a detector the outputs of which are estimates on coded bits, s components of said received vector ($Y$) being linear combinations of some modulation symbols of a same vector ($Z$) of $N_s$ modulation symbols to transmit, s being an integer value which verifies $s \leq N_s$, wherein the detector comprises a first detector block intended to estimate the coded bits associated to the modulation symbols of the vector ($Z$) of modulation symbols carried by said received data vector ($Y$) which are involved in said s linear combinations and a second detector block intended to estimate the coded bits associated to the modulation symbols of said vector ($Z$) of modulation symbols which are not involved in said linear combinations.

21. Apparatus according to claim 20, wherein linear combinations of modulation symbols are obtained at the transmitter side by an algebraic linear precoder, the first detector block allows to recover the diversity order brought by said algebraic linear precoder, and the second detector block is a linear detector providing either soft or hard output estimates.

22. Apparatus according to claim 21, wherein that the received vector Y is given by $$YV^\dagger = (ZSTH+N)V^\dagger = ZS\Delta + N_2$$

where the matrix H of the channel is written as $H=U\Delta_H V$ with U a $N_r \times N_t$ and unitary and V is a $N_r \times N_r$ unitary matrix, $\Delta_H$ is a diagonal rectangular $N_r \times N_r$ matrix of diagonal values which are dependent non-identically distributed random variables sorted in decreasing order of magnitude, the beamforming matrix T being the $N_s \times N_t$ matrix built from the $N_s$ first rows of $U^\dagger$, and $U^\dagger$ is the transpose conjugate of the matrix U, the vectors N and $N_2$ being white Gaussian noise vectors, characterised in that said received vector is given by $$YV^\dagger = [Z'S'D+N'; Z''D'+N'']$$

with $Z=[Z';Z'']$ being the vector of modulation symbols, D and D' both are s×s diagonal rectangular matrices, and N' and N'' both are noise vectors, and wherein the first detector block computed the conversion of $Z'S'D+N'$ into estimates on the coded bits associated to Z' and the second detector block computes the conversion of $Z''D'+N''$ into estimates on the coded bits associated to Z''.

23. System according to claim 22, wherein the s×s matrix D is decomposed by $D=\Omega\Psi\Phi$ where $\Omega$ is a s×s diagonal matrix such that $S'\Omega=T_u S'$ and $T_u$ is a s×s basis change matrix which entries are complex integer numbers, the diagonal s×s matrix $\Psi$ has positive real diagonal elements and the diagonal s×s matrix $\Phi$ has complex elements of unity modulus, at the receiver, $\Omega$ is chosen to optimize the performance of the system and the received signal $YV^\dagger$ is filtered by a matrix F given by $$F = \begin{bmatrix} \Phi^\dagger \Psi^{-1} S'^\dagger & 0 \\ 0 & I \end{bmatrix}$$

where I is an identity matrix, the first detector block converts the vector $Z'T_u + N'\Phi^\dagger \Psi^{-1} S'^\dagger$ into either hard or soft estimates on the coded bits associated to Z' and the second detector block converts $Z''D'+N''$ into either hard or soft estimates on the coded bits associated to Z''.

* * * * *